2 Sheets—Sheet 1.
J. S. & T. B. ATTERBURY.
MANUFACTURE OF LAMPS.
No. 109,370. Patented Nov. 22, 1870.
*Plate 1 Case B.* Fig. 1
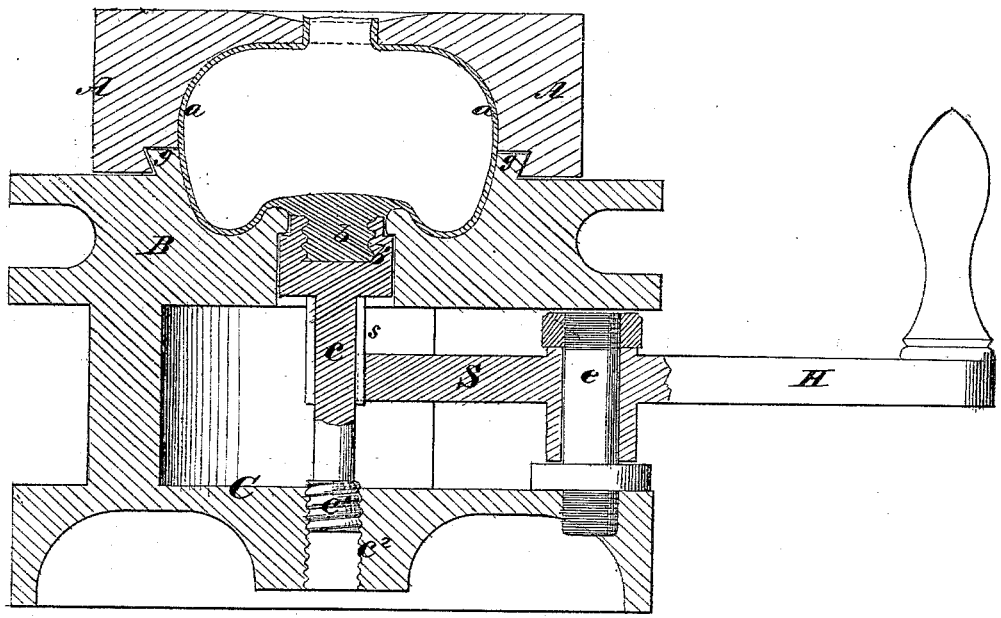
Fig. 2
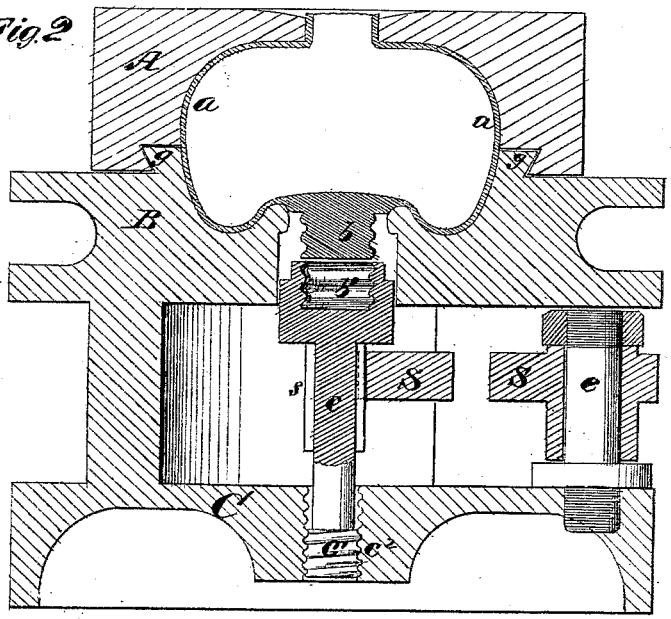
Witnesses:
R. T. Campbell
J. N. Campbell
Inventors:
James S. Atterbury
Thos. B. Atterbury
by
Marcy, Penwick & Lawrence 2 Sheets—Sheet 2.

J. S. & T. B. ATTERBURY.
MANUFACTURE OF LAMPS.

No. 109,370. Patented Nov. 22, 1870.

United States Patent Office.

JAMES S. ATTERBURY AND THOMAS B. ATTERBURY, OF PITTSBURG, PENNSYLVANIA.

Letters Patent No. 109,370, dated November 22, 1870.

IMPROVEMENT IN THE MANUFACTURE OF LAMPS.

The Schedule referred to in these Letters Patent and making part of the same.

To all whom it may concern:

Be it known that we, JAMES S. ATTERBURY and THOMAS B. ATTERBURY, of Pittsburg, in the county of Allegheny and State of Pennsylvania, have invented a new and useful Improvement in the Manufacture of Lamps; and we do hereby declare that the following is a full, clear, and exact description thereof, reference being had to the accompanying drawing making part of this specification, in which—

Figure 1, plate 1, is a section, taken vertically through a mold which is adapted for use in producing the lamps.

Figure 2, plate 1, is a similar view, showing a lamp finished and ready to be removed from the mold.

Figure 3:
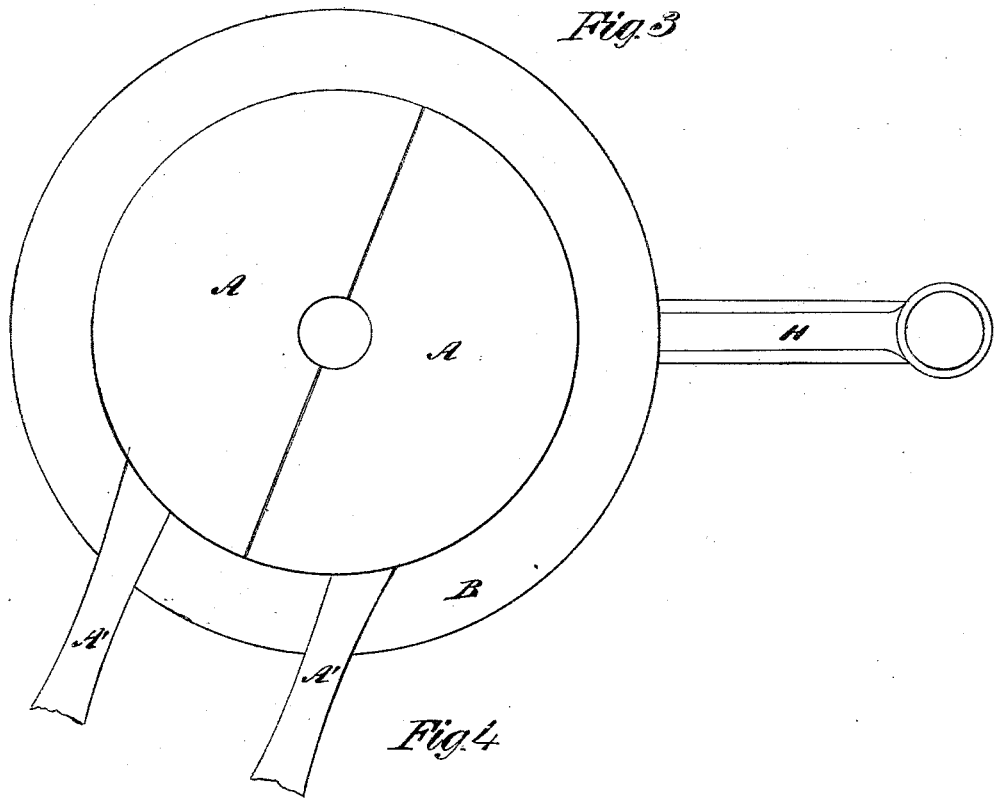

Figure 3, plate 2, is a top view of the mold.

Figure 4:
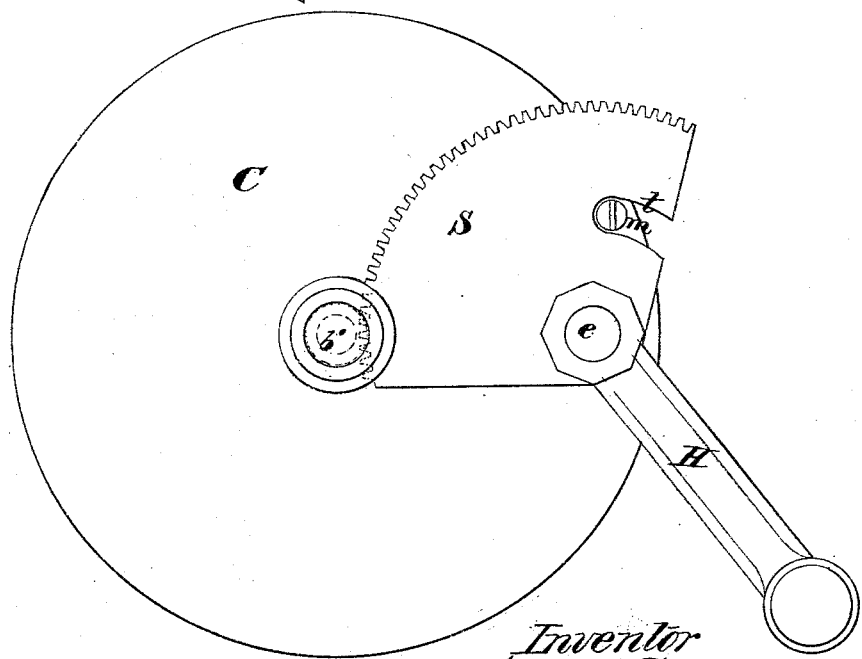

Figure 4, plate 2, is a top view of the screw-threaded socket and toothed segment supported upon the base of the mold.

Similar letters of reference indicate corresponding parts in the several figures.

The object of this invention is to produce screw-threads on the pegs of lamp-bowls and other articles of glass or vitreous ware, without leaving the joint-marks of the molds on the pegs.

The nature of our invention consists in a bottom section of mold, constructed and operated as hereinafter described, for making seamless screw-threaded pegs on the bottom of glass-ware.

To enable others skilled in the art to understand our invention, we will explain its construction and operation.

The mold in which the body or bowl $a$ of the lamp is formed may be made in the usual well-known manner; that is to say, it may be composed of an upper centrally-divided hinged portion, A, and a lower portion, B, which latter has an annular dovetail tenon, $g$, around the margin of its cavity, for receiving around it a correspoding groove formed into the bottom of the upper or divided section, and thus holding the two parts firmly together.

Through the center of the mold-section B a circular opening is made for receiving a cylindrical portion, $b'$, into the upper end of which a screw-threaded socket is formed.

When this screw-socket portion $b'$ is raised to the position indicated in fig. 1, against a shoulder formed around the upper end of the opening through the mold-section B, the mold is ready to have formed in it a lamp-bowl with a screw-threaded peg, $b$.

The mold-section is supported upon and elevated above a base section, C, into or through the center of which a screw-socket, $c^2$, is formed, adapted to receive into it a male screw, $c'$, which is formed on the stem $c$ of the screw-socket portion $b'$, as shown in figs. 1 and 2, plate 1.

On the stem $c$ are teeth $s$, which form a long pinion-wheel, and with these teeth engage the teeth The segment S turns about a fixed stem, $e$, and is provided with a stop-pin, $m$, rising from the base portion C, which pin will stop the segment when the screw-socket piece $b'$ is raised to its highest point, indicated in fig. 1, and also stop the further descent of the said socket piece when it is freed from a peg, as indicated in fig. 2.

The operation is as follows:

The workman gathers a suitable quantity of hot glass on the end of his punty, and places this glass into the center of the section B and screw-socket $b'$ to form the screw-peg $b$.

The workman then gathers another piece of hot glass on the punty to form the body of the fount or bowl $a$, and this, being put into the mold, unites with the glass which forms the peg.

The top portion of the mold is then adjusted in place, as shown in fig. 1, and the bowl $a$ is formed by blowing in the usual manner.

Having completed the article in the mold, the segment S is moved around and the screw-socket portion $b'$ depressed by unscrewing it from the peg $b$, thus forming a peg without a joint-mark.

It will be seen, by reference to figs. 1 and 2, that the screw-peg $b$ is formed in a concavity of the lamp-bowl, and does not extend below the lowest portion of this bowl.

This feature is described and claimed under an application for Letters Patent filed July 25, 1870, and is therefore not claimed under this petition.

We do not confine our invention to lamp-bowl of founts of the form shown in the drawing, as it is obvious that the invention is applicable to all forms of lamp-bowls, founts, or reservoirs having screw-pegs on them, as well as other articles having screw-pegs.

Neither do we limit our invention to making male screw-threads on glass or vitreous hollow articles, as it may very readily be modified, by substituting a stem, $b$, with a male instead of a female molding-screw, and thus be used for making female threads on portions of such articles.

Neither do we limit ourselves to the vibrating sector and pinion for revolving the stem $c$ as a crank, for other well-known gearing may be substituted therefor without departing from our invention.

What we claim as our invention, and desire to secure by Letters Patent, is—

The lower mold $b'$, operated by the stem $c$, male and female screws $c^1 c^2$, and an apparatus which revolves this stem, in combination with the mold which makes the bottom of a vessel, for making seamless screw-threaded pegs on the bottoms of glass or other vitreous ware.

JAMES S. ATTERBURY.
THOMAS B. ATTERBURY.

Witnesses: